(No Model.)

L. TOLAN, Jr. & F. L. MORTON.
LOCK NUT.

No. 502,477. Patented Aug. 1, 1893.

Witnesses.
John Shinn
John Dolman

Inventors.
Lewis Tolan, Jr
Francis L. Morton
by John Dolman, Jr
Attorney

UNITED STATES PATENT OFFICE.

LEWIS TOLAN, JR., AND FRANCIS L. MORTON, OF PHILADELPHIA, PENNSYLVANIA.

LOCK-NUT.

SPECIFICATION forming part of Letters Patent No. 502,477, dated August 1, 1893.

Application filed April 25, 1893. Serial No. 471,745. (No model.)

*To all whom it may concern:*

Be it known that we, LEWIS TOLAN, Jr., and FRANCIS L. MORTON, both citizens of the United States, residing at Philadelphia, in the county of Philadelphia and State of Pennsylvania, have invented a new and useful Improvement in Lock-Nuts, of which the following is a specification.

The object of our invention is to provide a nut which shall firmly grasp the bolt when screwed thereon, so as not to work loose, and which may be readily removed and replaced if required.

Our improved nut is in two parts which may be separately screwed on, and we term them the female nut and the male nut.

Figure 1:
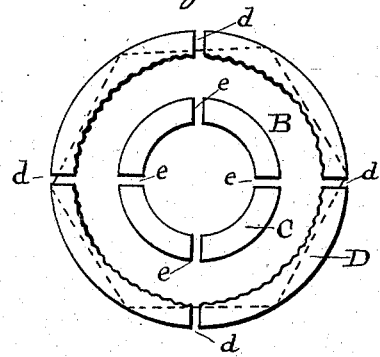
Figure 2:
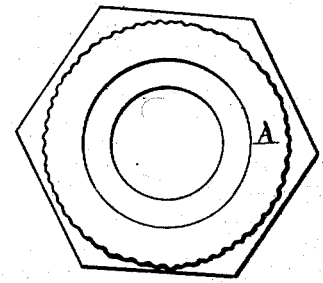

Referring to the drawings, which form part of this specification, and in which similar letters of reference refer to similar parts, Figure 1 is a top view of the female nut; Fig. 2 a bottom view of the male nut, and Figs. 3 and 4 are respectively sectional views of Figs. 1 and 2.

Figure 3:
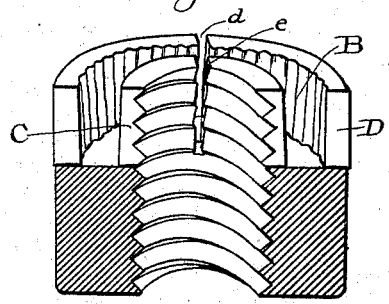
Figure 4:
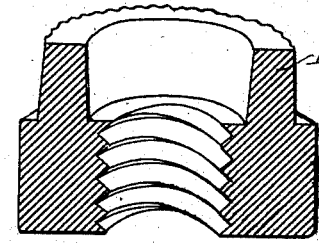

The female nut, Figs. 1 and 3, is of the form shown, being provided with an annular groove B. cut into its top or outer face, thus dividing it into two concentric annular or cylindrical projections, C. D. which are beveled or sloped from the top down, as shown in Fig. 3. The projections, C. D., are provided with slits or kerfs $e$. and $d$. at intervals around their peripheries. The male nut, Figs. 2 and 4, is provided with an annular or cylindrical projection A., adapted to fit tightly in the groove B. The outer surface of A. and the inner surface of D. are roughened or corrugated as shown.

In use, the female nut is first screwed home on the bolt, and then the male nut is screwed to place forcing the projection A well into the grooves of the female nut, compressing the rim or projection C., and forcing it tight against the body of the bolt, thus preventing the turning of the female nut; the outer surface of A. is at the same time tightly pressed against the projection D. and, by aid of the corrugations, held from rotation, thus securing the male nut in position.

What we claim as our invention is—

1. In a lock nut, the combination of a female nut provided with an annular groove, and a male nut provided with an annular projection adapted to jam in the groove of the female nut, substantially as shown and described.

2. In a lock nut, a female nut having the annular cylindrical projections C. D., slit or divided at intervals, in combination with a male nut having the annular cylindrical projection A. adapted to compress the projection C. and expand the projection D. by jamming between them, as shown and described.

3. In a lock nut a female nut having two concentric annular projections, beveled or increasing in thickness from the top down, divided at intervals by saw kerfs, and the inner surface of the outer projection corrugated, in combination with a male nut having one annular projection beveled and the outer surface corrugated, adapted to jam between the two projections of the female nut, substantially as shown, described and for the purpose specified.

In testimony whereof we have hereunto signed our names in the presence of two subscribing witnesses.

LEWIS TOLAN, JR.
     FRANCIS L. MORTON.

Witnesses:
 WILLIAM T. MORTON,
 MARGARET F. JOHNSON.